(12) United States Patent  
Lee

(10) Patent No.: US 6,341,440 B1  
(45) Date of Patent: Jan. 29, 2002

(54) MULTI-FUNCTION SIGNBOARD

(75) Inventor: Ching-Chuan Lee, Taipei (TW)

(73) Assignee: Wen Tai Enterprise Co., Ltd. (TW)

( * ) Notice: Subject to any disclaimer, the term of this patent is extended or adjusted under 35 U.S.C. 154(b) by 0 days.

(21) Appl. No.: 09/457,722

(22) Filed: Dec. 10, 1999

(51) Int. Cl.[7] ............................................. G09F 13/18
(52) U.S. Cl. .............................. 40/546; 40/541; 40/581
(58) Field of Search .............................. 40/541, 124.02, 40/544, 546, 570, 764, 734, 581, 564, 522, 542; 362/89, 235, 249, 812, 26, 31

(56) References Cited

U.S. PATENT DOCUMENTS

| | | | | |
|---|---|---|---|---|
| 2,994,148 A | * | 8/1961 | Endelson | 40/546 |
| 3,906,650 A | * | 9/1975 | Coffman | 40/130 B |
| 4,386,476 A | * | 6/1983 | Schulman | 40/546 |
| 4,791,745 A | * | 12/1988 | Pohn | 40/546 |
| 4,985,809 A | * | 1/1991 | Matsui et al. | 362/31 |
| 5,027,258 A | * | 6/1991 | Schoniger et al. | 362/31 |
| 5,433,024 A | * | 7/1995 | Lerner | 40/546 |
| 5,526,236 A | * | 6/1996 | Burnes et al. | 362/20 |
| 5,640,792 A | * | 6/1997 | Smith et al. | 40/546 |
| 5,829,177 A | * | 11/1998 | Hjaltason | 40/546 |
| 5,915,855 A | * | 6/1999 | Murase et al. | 40/546 |
| 5,950,340 A | * | 9/1999 | Woo | 40/564 |
| 5,954,423 A | * | 9/1999 | Logan et al. | 40/570 |
| 5,964,051 A | * | 10/1999 | Loeber et al. | 40/570 |
| 6,050,010 A | * | 4/2000 | Garcia et al. | 40/124.02 |

* cited by examiner

Primary Examiner—Lynne H. Browne
Assistant Examiner—Kenn Thompson
(74) Attorney, Agent, or Firm—Troxell Law Office PLLC

(57) ABSTRACT

A multi-function signboard includes a frame seat, a light seat, a light diffusion strip, a display board, a circuit board and a power source portion. The frame seat is a hollow light impermeable structure having a top portion that sinks downward to form a frame rib, and a frame groove, and has two ends respectively connected to an end cap. The light seat is an elongate seat that has connecting wires connected to the circuit board, and a plurality of light emitting diodes of different colors arranged in sets of three to provide light of different colors. The light diffusion strip is a transparent elongated strip with a length equal to that of the light seat, and is disposed on the light seat. The light diffusion strip and the light seat are together disposed in the frame groove. The diffusion strip is provided with semi-circular holes corresponding to the light emitting diodes to diffuse the colored light emitted by the light emitting diodes. The display board is a transparent board structure that has a bottom portion inserted into the frame groove and supported by the light diffusion strip. The display board has a surface with an ornamental marking formed by words and/or devices to reflect the colored lights emitted from the light seat and the light diffusion strip to thereby achieve an ever-changing and multifarious lighting effect. The circuit board is a conventional control circuit that is provided in the frame seat and that has connecting wires connected to the light seat and a power source portion to control one or any two or all three in each set of light emitting diodes to flash alternately. The power source portion is adapted to supply power to the circuit board from an external power source to thereby control the light seat.

10 Claims, 3 Drawing Sheets

MULTI-FUNCTION SIGNBOARD

BACKGROUND OF THE INVENTION

1. Field of The Invention

The present invention relates to a multi-function signboard, more particularly to a signboard that utilizes high-luminosity light emitting diodes in cooperation with a light diffusion strip to enable words or devices on the surface of a display board to change colors and to enable the colored light to distribute in a uniform manner. More importantly, when external power supply is abnormal, the signboard of the present invention can serve as an emergency and warning light.

2. Description of Related Art

Signboards and signposts are important to business in advertising the goods or services provided thereby. In densely populated areas of a city, signboards and signposts can help draw and guide consumers.

A conventional signboard includes a frame holding a display board of transparent acrylic or glass. The surface of the display board have an ornamental marking formed by words and/devices adhered thereto or inscribed thereon. Such display is static. There is also another type of conventional signboard in which lights are arranged around the display board to project light thereon. The ornamental marking on the display board reflects the light projected thereon to achieve changes in light and hues. A drawback with such a conventional signboard is that the lights and the display board are separately arranged and have to be installed onsite. Besides, the light projected is in a single color, which appears monotonous and boring after a period of time.

Manufacturers have later developed a signboard that includes lighting fixtures and a transmission device mounted in a frame. The light fixtures are generally fluorescent lamps that have strips of different colors adhered thereto. The transmission device includes a motor and a speed reduction means driven thereby. The reduction means engages a rotary shaft end at one end of the lighting fixtures. When the lighting fixtures rotate, the lights from the colored strips enter in sequence from the bottom portion of the display board to be reflected by the ornamental marking on the display board, thereby achieving a colorful and preferred visual effect. However, there is the drawback that fluorescent lamps have a limited service life and have to be replaced after a period of time. Besides, it is necessary to adhere colored strips to the new fluorescent lamps. Furthermore, the transmission device and the fluorescent lamps are power-consuming, which is quite uneconomical. Furthermore, the change in colors is determined by the colored strips; it is not possible to permit colorful and planned change of colors.

SUMMARY OF THE INVENTION

A primary object of the present invention is to provide a multi-function signboard that eliminates the drawbacks of the prior art.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
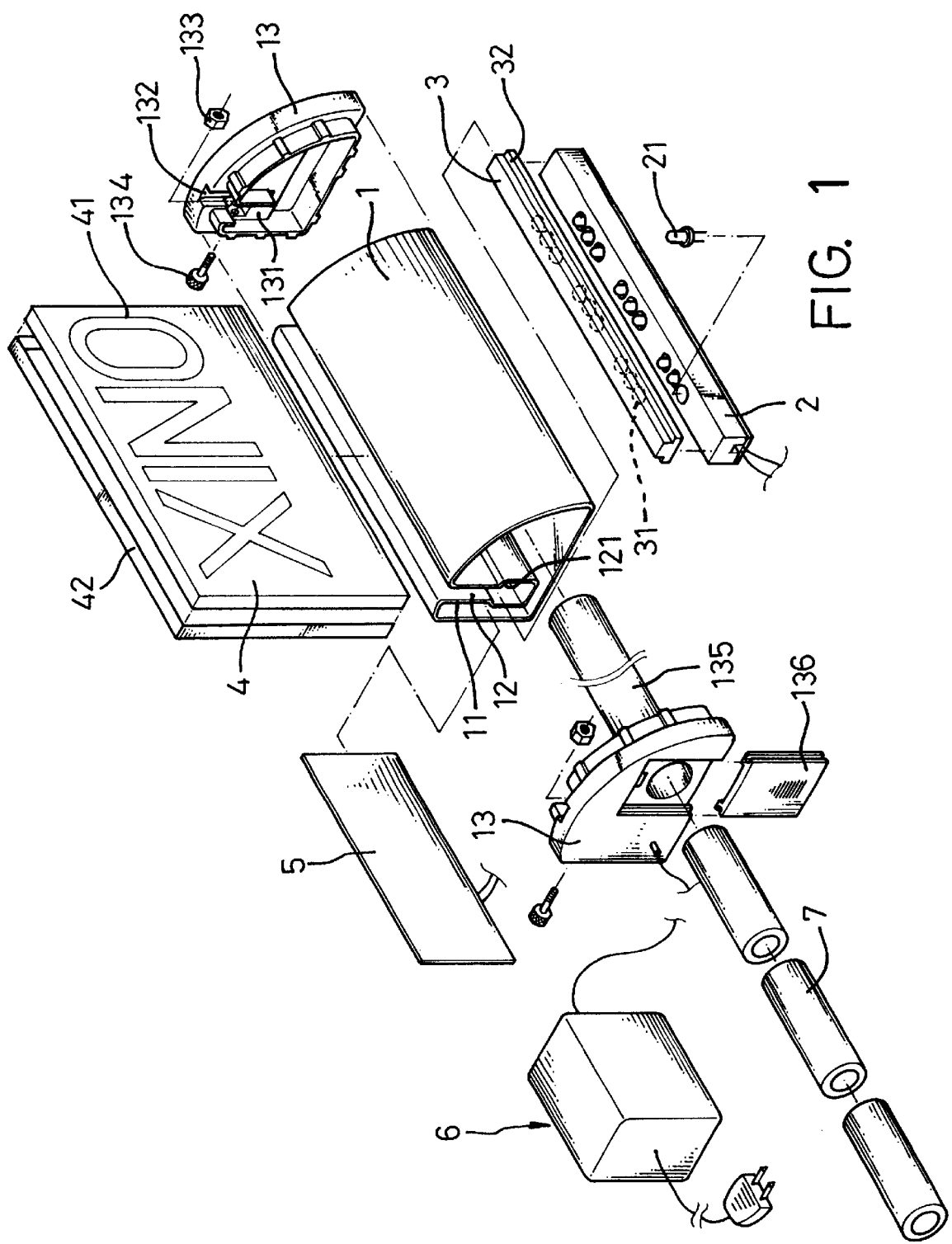
FIG. 1 is an exploded perspective view of the present invention.
Figure 2:
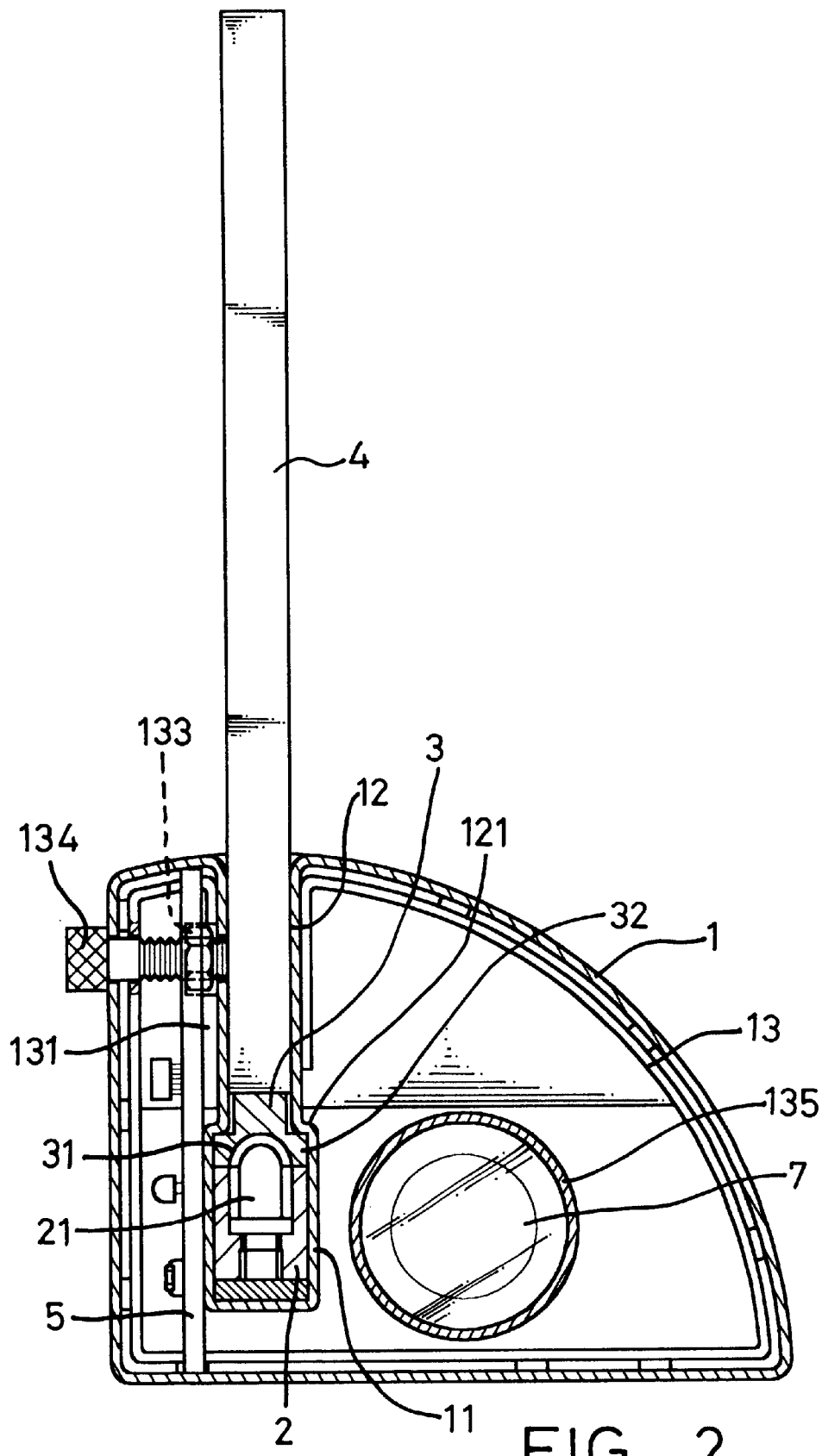
FIG. 2 is an assembled sectional view of the present invention.
Figure 3:
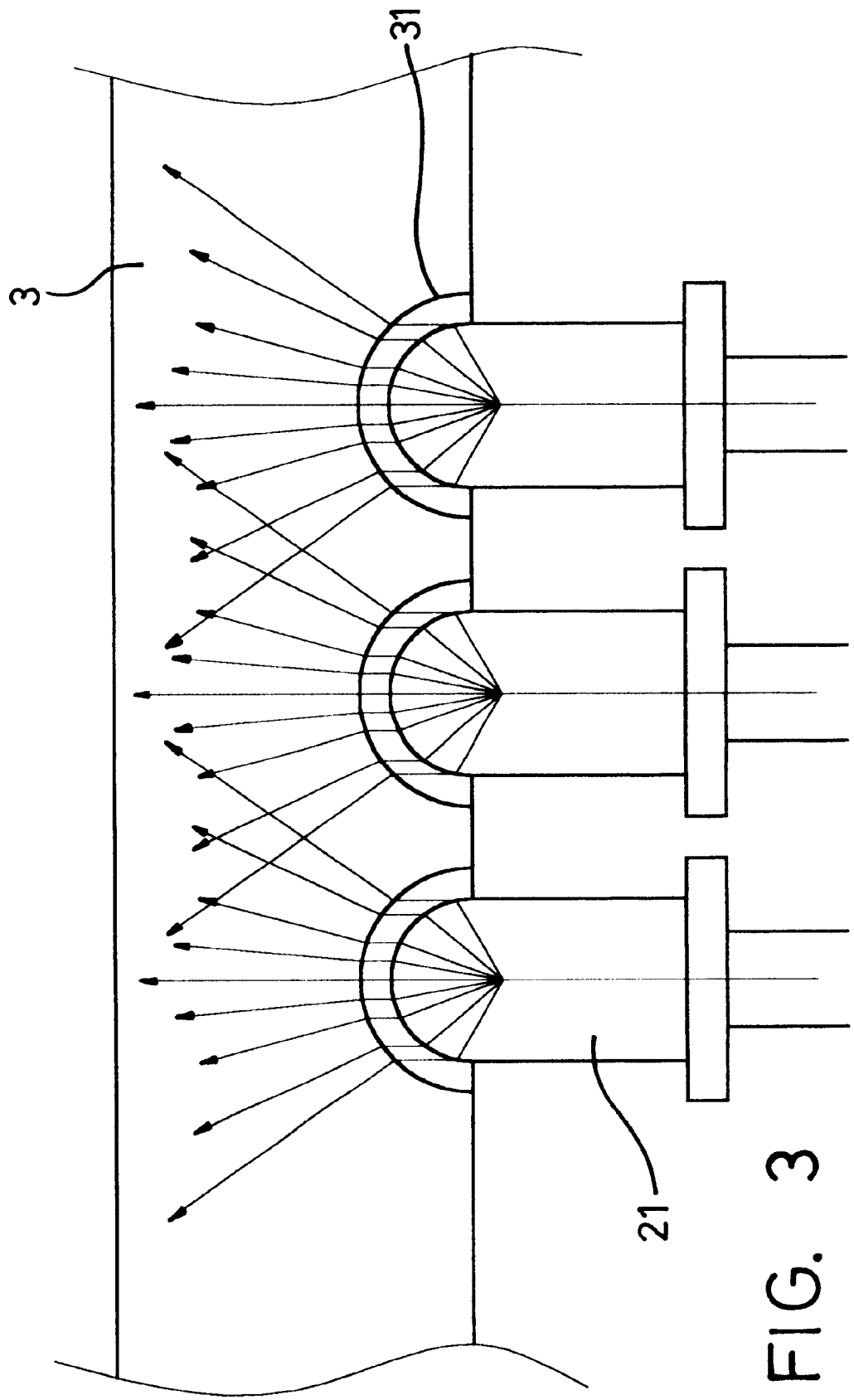
FIG. 3 is a schematic view illustrating light diffusion in the present invention.

With reference to FIGS. 1 to 2, a signboard of the present invention includes a frame seat 1, a light seat 2, a light diffusion strip 3, a display board 4, a circuit board 5, and a power source portion 6.

The frame seat 1 is a hollow light impermeable structure having a top portion that sinks downward to form a frame rib 11, and a frame groove 12 for receiving the light seat 2, the light diffusion strip 3, and the display board 4. In addition, the frame seat 1 has two ends respectively connected to an end cap 13. Each end cap 13 is provided with a cap rib 131 that depresses downwardly to correspond to the frame groove 12, and a cap groove 132 for positioning and supporting the display board 4. In order that the display board 4 will not displace forwardly or rearwardly, the cap ribs 131 of the end caps 13 are respectively provided with a nut 133. A screw rod 134 passes through the frame seat 1 to be locked with each nut 133 with an end portion abutting the display board 4, thereby connecting firmly the frame seat 1, the end caps 13, and the display board 4.

The light seat 2 is an elongate seat having connecting wires connected to the circuit board 5, and has a plurality of light emitting diodes 21 of different colors arranged in sets of three. Preferably, the three light emitting diodes 21 in each set are red, blue and green. By means of the circuit board 5 that control the electrical circuitry, the light emitting diodes 21 can be controlled to have only the red one, or any two, or all three of the light emitting diodes 21 to flash alternately so as to display light of seven different colors, red, blue, green, magenta, yellow, cyan and white.

The light diffusion strip 3 is a transparent elongated strip with a length equal to that of the light seat 2, and straddles the light seat 2. The light diffusion strip 3 is provided with semi-circular holes 31 corresponding to the light emitting diodes 21 to diffuse the colored light emitted by the light emitting diodes during passage of the light therethrough, so that all the colored light can enter the display board 4 with a uniform hue.

The display board 4 is a transparent board structure. In use, the display board 4 is preferably formed from glass or acrylic. The display board 4 has a bottom portion inserted into the frame groove 12 and supported by the light diffusion strip 3. The surface of the display board 4 is provided with an ornamental marking 41 formed by words and/or devices to reflect the colored lights emitted from the light seat 2 and the light diffusion strip 3 to thereby achieve an ever-changing and multifarious lighting effect. In addition, two side ends and a top edge of the display board 4 have a light reflecting sheet 42 adhered thereto to avoid loss of the light emitted by the light emitting diodes 2 1 and increase the brightness of the display board 4.

Furthermore, in order to achieve preferred positioning and contact relationship among the light seat 2, the light diffusion strip 3 and the display board 4, an intermediate section of the frame groove 12 is provided with a frame bend 121 on each side so that the frame groove 12 is narrow at the top, wider at the bottom. The two frame bends 121 abut against stops 32 on both sides of the light diffusion strip 3. Hence, the light diffusion strip 3 along with the light seat 2 can be fixedly disposed in the wider portion of the frame groove 12, while the display board 4 is insertably disposed in the narrower portion of the frame groove 12 with the bottom edge thereof connected to the light diffusion strip 3.

The circuit board 5 is a conventional control circuit that is provided in the frame seat 1 and that has connecting wires connected to the light seat 2 and the power source portion 6. The circuit board 5 controls the light emitting diodes 21 to alternately flash to generate light of different colors.

The power source portion 6 supplies power to the circuit board 5 from an external power source to thereby control the light seat 2.

The present invention can also be used as an emergency light and warning device. A tubular post 135 extends from an inner side of one of the end caps 13 and accommodates therein a plurality of rechargeable batteries 7. A sealing cap 136 seals the opening of the tubular post 135. The tubular post 135 has connecting wires connected to the control circuit of the circuit board 5. When there is any trouble, for instance, external power cut, the control circuit will automatically switch to an emergency state so that the batteries 7 start supplying power to the circuit board 5 to actuate the blue and green light emitting diodes 21 to be on and to cause the red light emitting diodes 21 to blink. The frequency of blinking of the red light emitting diodes 21 is quicker than the ordinary flashing to exhibit an emergency and warning effect. When the external power supply resumes, the circuit board 5 is restored to its normal state and automatically recharges the batteries 7 via the control circuit so as to make up for the consumption of energy.

In the present invention, by means of the control circuit of the circuit board 5, the light seat 2 can be controlled to cause the light emitting diodes 21 to alternately flash and to cause only one or any two or all three in a set to emit light so as to generate changing light of seven colors, and the colored light enter via the semi-circular holes 31 of the light diffusion strip 3 into the display board 4 in a uniform manner to change the color of the ornamental marking 41. Compared to the conventional signboards, the present invention eliminates the use of transmission devices and the trouble of adhering colored strips to the lights. In addition, when external power supply fails, the batteries 7 can supply power to the circuit board 5 to cause the blue and green light emitting diodes 21 to be on, with the red light emitting diodes 21 blinking, thereby achieving an emergency and warning light. Furthermore, the light emitting diodes 21 used in the present invention have high luminosity and energy-saving, which are absent in the prior art as well. More importantly, the light reflecting sheets 42 adhered to two side ends and the top edge of the display board 4 can generate a mirror effect to enhance the overall brightness of the display board 4 and reduce the loss of light from the light emitting diodes 21.

Although the present invention has been illustrated and described with reference to the preferred embodiment thereof, it should be understood that it is in no way limited to the details of such embodiment but is capable of numerous modifications within the scope of the appended claims.

What is claimed is:

1. A multi-function signboard, comprising:
    a frame seat sinking downward to form a frame rib bounding a frame groove, and having two ends, each respectively connected to an end cap;
    an elongated light seat having connecting wires connected to a circuit board and a plurality of sets of light-emitting diodes (LEDs), each set having at least three LEDs of different colors to provide colored light of different colors, where the circuit board has a power source to cause at least one LED in each set of LEDs to flash alternately;
    a transparent and colorless light diffusion strip disposed on the light seat, the light diffusion strip and the light seat together disposed in the frame groove, the diffusion strip having holes therein accommodating the LEDs, the diffusion strip diffusing the colored light emitted by the LEDs;
    a transparent display board mounted in the frame groove in contact with the light diffusion strip, and having an ornamental marking to reflect the colored light emitted from the light seat and the light diffusion strip to achieve an ever-changing and multifarious lighting effect; and,
    a reflecting sheet adhered to the display board to reflect the colored light emitted by the LEDs to the display board.

2. The signboard of claim 1, wherein the LEDs are high-luminosity LEDs.

3. The signboard of claim 1, wherein the at least three LEDs in each of the plurality of sets are red, blue, and green in color.

4. The signboard of claim 3, wherein the blue and green LEDs in each of the plurality of sets remain on continuously and the red LED in each of the plurality of sets blinks on and off.

5. The signboard of claim 1, wherein each end cap has a downward cap rib aligned with the frame groove, and a cap groove positioning and supporting the display board.

6. The signboard of claim 5, wherein the cap rib of each end cap has a nut, a screw passing through the frame seat engaging the nut and abutting against the display board, such that the screw and the nut firmly connect the frame seat, the end caps, and the display board together.

7. The signboard of claim 1, wherein the display board is formed from one of transparent acrylic and transparent glass.

8. The signboard of claim 1, wherein the power source is adapted to supply power to the circuit board from an external power source to control the light seat.

9. The signboard of claim 1, wherein an intermediate section of the frame rib has a frame bend on opposite sides so that the frame groove has a narrow portion and a wide portion, each frame bend abutting against a stop on the light diffusion strip, such that the light diffusion strip along with the light seat is fixedly disposed in the wide portion of the frame groove, and the display board is disposed in the narrow portion of the frame groove.

10. The signboard of claim 1, further comprising an emergency light and warning device comprising a tubular post extending into the frame seat from one of the end caps and accommodating therein at least one rechargeable battery, such that the circuit board automatically switches to an emergency state when external power fails and the at least one battery supplies power to the circuit board.

* * * * *